US010671709B2

(12) United States Patent
Gabriel et al.

(10) Patent No.: US 10,671,709 B2
(45) Date of Patent: Jun. 2, 2020

(54) DATA ISOLATION IN DISTRIBUTED HASH CHAINS

(71) Applicant: INTUIT INC., Mountain View, CA (US)

(72) Inventors: Michael R. Gabriel, Mountain View, CA (US); Glenn Scott, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 235 days.

(21) Appl. No.: 15/876,629

(22) Filed: Jan. 22, 2018

(65) Prior Publication Data
US 2019/0228132 A1 Jul. 25, 2019

(51) Int. Cl.
*G06F 21/10* (2013.01)
*H04L 29/08* (2006.01)
*H04L 9/06* (2006.01)
*G06F 21/64* (2013.01)
*G06F 21/62* (2013.01)

(52) U.S. Cl.
CPC .......... *G06F 21/10* (2013.01); *G06F 21/6245* (2013.01); *G06F 21/64* (2013.01); *H04L 9/0637* (2013.01); *H04L 9/0643* (2013.01); *H04L 67/104* (2013.01); *H04L 2209/38* (2013.01)

(58) Field of Classification Search
CPC ...... G06F 21/10; G06F 21/6245; G06F 21/64; H04L 9/0637; H04L 9/0643; H04L 67/104; H04L 2209/38
USPC .......................................................... 726/4
See application file for complete search history.

(56) References Cited

U.S. PATENT DOCUMENTS

| 6,826,690 | B1 * | 11/2004 | Hind | G06F 21/31 |
| | | | | 713/173 |
| 8,393,007 | B2 * | 3/2013 | Stefik | G06F 21/10 |
| | | | | 726/29 |
| 10,171,509 | B2 * | 1/2019 | Anderson | H04L 9/3236 |
| 2004/0064692 | A1 * | 4/2004 | Kahn | G06F 21/10 |
| | | | | 713/167 |
| 2011/0246765 | A1 * | 10/2011 | Schibuk | H04L 63/0428 |
| | | | | 713/158 |
| 2016/0044108 | A1 * | 2/2016 | Vermeulen | H04L 67/42 |
| | | | | 709/218 |

(Continued)

FOREIGN PATENT DOCUMENTS

EP 3451608 A1 * 3/2019 ........... H04L 63/102

OTHER PUBLICATIONS

International Search Report/Written Opinion issued to PCT/US2018/051942 dated Jan. 7, 2019.

*Primary Examiner* — Taghi T Arani
*Assistant Examiner* — Badri Narayanan Champeksan
(74) *Attorney, Agent, or Firm* — Patterson + Sheridan, LLP

(57) ABSTRACT

Certain aspects of the present disclosure provide techniques for managing data in a plurality of nodes of a distributed system. Embodiments include storing, by a node of the plurality of nodes, sensitive data in a block of a hash chain. Embodiments further include determining, by the node, that the sensitive data should not be distributed to other nodes of the plurality of nodes. Embodiments further include distributing, by the node, a limited version of the block to the other nodes. The limited version of the block may comprise a hash and a pointer to a previous block of the hash chain, and the limited version of the block may not contain the sensitive data.

18 Claims, 6 Drawing Sheets

(56) References Cited

U.S. PATENT DOCUMENTS

2017/0041296 A1* 2/2017 Ford ................... H04L 63/0421
2017/0230353 A1* 8/2017 Kurian ................ H04L 63/0815
2019/0065709 A1* 2/2019 Salomon .............. H04L 9/3239
2019/0097807 A1* 3/2019 Mahanta .............. H04L 63/10
2019/0165949 A1* 5/2019 Ramos ................ H04L 9/3247

* cited by examiner

DATA ISOLATION IN DISTRIBUTED HASH CHAINS

INTRODUCTION

Aspects of the present disclosure generally relate to maintaining data in distributed systems. In particular, embodiments of the present disclosure involve isolating sensitive data in distributed hash chains.

BACKGROUND

Distributed systems may comprise hash chains (e.g., blockchains), which are data structures that record data in a fashion analogous to a chain. Each update to the chain creates a new block containing the data and each block is linked to the previous block by a cryptographic function. Blocks are generally appended to the end of the chain and, once in the chain, resist modification so that the cryptographic links in the chain are preserved. Entities (e.g., applications) that receive data from blocks of the chain may check the cryptographic links to test the validity of the chain. Any modification of a block is detected and subject to remedial or other action. Hash chains are generally managed by peer-to-peer networks, which collectively adhere to an established protocol for validating each new block and are designed to be inherently resistant to modification of data. Once recorded, the data in any given block cannot be modified without the alteration of subsequent blocks and the involvement of the network.

Hash chains are often maintained in a distributed manner, such that a copy of the entire chain or a portion of the chain is maintained on each of a plurality of nodes connected over a network. Because nodes may have different security attributes, may be in different geographic regions, and/or may be associated with different entities that have different levels of access to data, some types of data may not be suited for storage on all nodes in a system. For example, sensitive data may need to be stored in particular nodes or in particular geographic regions. This may present problems in the context of distributed hash chains, as hash chains store data in a serial fashion, and generally validate data based on a traversal of the entire chain. If one block of a distributed hash chain contains sensitive data not suitable for storage on certain nodes in a system, the integrity of the chain may be broken on these nodes. As such, there exists a need for improved techniques of isolating data in distributed hash chains.

BRIEF SUMMARY

Certain embodiments provide a computer-implemented method for managing data in a plurality of nodes of a distributed system. The method generally includes storing, by a node of the plurality of nodes, sensitive data in a block of a hash chain. The method further includes determining, by the node, that the sensitive data should not be distributed to other nodes of the plurality of nodes. The method further includes distributing, by the node, a limited version of the block to the other nodes. The limited version of the block may comprise a hash and a pointer to a previous block of the hash chain, and the limited version of the block may not contain the sensitive data.

Other embodiments provide a system comprising a processor and a non-transitory computer-readable medium storing instructions which, when executed by the processor, cause the processor to perform an operation for managing data in a plurality of nodes of a distributed system. The operation generally includes storing, by a node of the plurality of nodes, sensitive data in a block of a hash chain. The operation further includes determining, by the node, that the sensitive data should not be distributed to other nodes of the plurality of nodes. The operation further includes distributing, by the node, a limited version of the block to the other nodes. The limited version of the block may comprise a hash and a pointer to a previous block of the hash chain, and the limited version of the block may not contain the sensitive data.

Other embodiments provide a non-transitory computer-readable medium storing instructions which, when executed by the processor, cause the processor to perform an operation for managing data in a plurality of nodes of a distributed system. The operation generally includes storing, by a node of the plurality of nodes, sensitive data in a block of a hash chain. The operation further includes determining, by the node, that the sensitive data should not be distributed to other nodes of the plurality of nodes. The operation further includes distributing, by the node, a limited version of the block to the other nodes. The limited version of the block may comprise a hash and a pointer to a previous block of the hash chain, and the limited version of the block may not contain the sensitive data.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
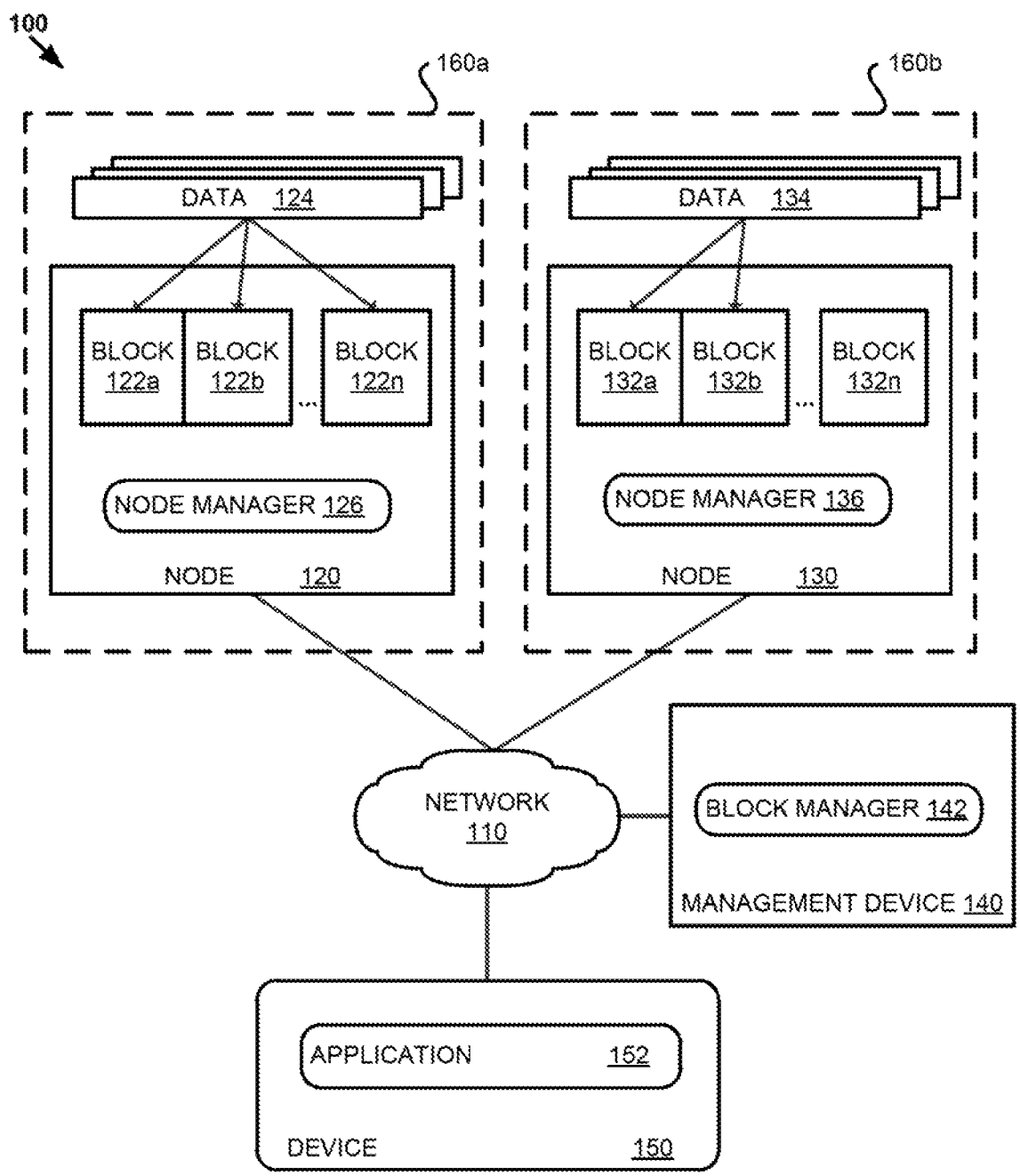
FIG. 1 depicts an example computing environment in which embodiments of the present disclosure may be implemented.

Aspects of the present disclosure provide apparatuses, methods, processing systems, and computer readable mediums for data isolation in distributed hash chains.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

In certain embodiments, a hash chain may be distributed across a plurality of nodes, each node comprising a copy of the hash chain. A block on the hash chain generally comprises a payload with data, as well as header information comprising a hash of the data and a pointer to the previous block on the chain. In some embodiments, the hash may serve as an identifier for the block. When a new block is added to the hash chain on a particular node, the node may determine whether the block contains sensitive data. For example, the block may contain data which must be stored in nodes that meet certain security requirements, such as being within a particular administrative domain. An administrative domain may comprise one or more entities, groups, regions, or the like, that may, for example, have some relation to an item of sensitive data. For example, an administrative domain may be one or more geographic regions, one or more users, one or more companies, one or more nodes, or the like. Personal information of German citizens, for example, may need to be stored in nodes located in Germany. As another example, the block may contain sensitive data which may only be accessed by certain entities. For instance, a plurality of companies (e.g., corporate entities) may store data on a shared distributed hash chain, and nodes associated with a particular company may not be able to store sensitive data associated with another company. If the node determines that the block contains sensitive data that cannot be stored on certain other nodes in the system, the node may locally store the block and then generate a limited version of the block which only includes the hash and the pointer to the previous block, but does not include the data (e.g., the payload). The node may then distribute the limited block to the other nodes in the system that do not meet the security requirements of the block. In some embodiments, the node distributes the full block to nodes which do meet the security requirements of the block. The limited block allows for the integrity of the chain to be maintained on all nodes, but prevents the sensitive data from being stored on nodes which do not meet the applicable security requirements.

Permissions to access blocks containing sensitive data may be maintained in a distributed manner. For example, the node may send permission information for the block to all of the other nodes in the system. Permission information may specify the security requirements for accessing the block or the particular entities or types of entities that can access the block. Permission information may, for instance, specify geographic regions, particular users, particular companies, particular nodes, or the like. For example, permission information for the block may specify that access to the sensitive data is limited to entities located in a particular geographic region, such as Germany. Each node that stores the block with the sensitive data may enforce the permissions by determining whether a requesting entity meets the security requirements of the block based on the permission information. If a requesting entity, such as another node or an application, meets the security requirements of the block, then the node may return the sensitive data to the requesting entity. Otherwise, the node may deny the request. If a node receives a request for data but only has a limited block associated with the data, the node may determine whether the requesting entity has permission to access the data, and then, if the requesting entity does have permission to access the data, send a request to a node with the complete block to provide the data directly to the requesting entity. In other embodiments, a node with a limited block may forward a request for data associated with the limited block to a node with the complete block, and the node with the complete block may determine whether the requesting entity has permission to access the data before providing the data to the requesting entity.

Validation of data in distributed hash chains according to embodiments of the present disclosure may be performed in a variety of different ways. When a node contains a complete copy of the hash chain with all of the data in each block, validation generally involves traversing the chain starting with the tail (e.g., the most recently added block) and calculating the hash of the data in each block in order to confirm that the calculated hash matches the hash stored in the block header. Once the head of the chain (e.g., the first block added to the chain) is reached and validated, the entire chain has been validated, and the data stored thereon may be confirmed as valid. However, if a node contains a hash chain with a limited block, the node may not be able to use this validation technique, as the limited block does not contain the data of the original block from which it was created.

In some embodiments, a lightweight validation may be performed, where the node calculates the hash of each complete block (e.g., each block including the data as a payload) and compares it to the hash in the header of these blocks, but assumes the hashes in the headers of any limited blocks are correct. This lightweight validation method may provide certain advantages, such as resource efficiency. In another embodiment, one or more nodes with full storage privileges (e.g., nodes which meet the security requirements of sensitive data on the chain, and that store the complete blocks comprising the sensitive data) may act as validators, and nodes with limited blocks may direct validation requests to one or more of these nodes. In some embodiments, a node with a complete block may calculate a hash based on the data of the block and forward the calculated hash to an entity requesting validation, and the entity requesting validation may compare the calculated hash to a locally stored hash (e.g., in the header of a limited block stored by the node requesting validation) to verify that the limited block was created based on a valid complete block.

In alternative embodiments, an entity requesting validation may include its locally stored hash in a request for validation, and the node with the complete block may calculate a hash based on the data of the complete block and compare the calculated hash to the hash received in the request for validation in order to determine whether the hashes match. In other embodiments, a node with a complete block may locally validate the block and send a validation confirmation to an entity requesting validation. A validation confirmation may comprise a message indicating the block has been validated. In some embodiments, one or more nodes storing a complete copy of the chain with all complete blocks may handle all validation, and may send validation confirmations for the entire chain to entities requesting validation.

In certain embodiments, certain functions associated with management of a distributed hash chain may be performed by a centralized management entity. The centralized management entity may maintain permission information, as well as information indicating which nodes store complete blocks and limited blocks. When an entity requests data from the chain, the centralized management entity may determine whether the requesting entity has access to the data and/or may direct the request to a node which maintains a complete block comprising the data. The centralized management entity may also receive and route validation requests to nodes capable of validation, such as nodes that contain complete blocks.

In some embodiments, one or more hash trees or Merkle trees may be maintained in association with the distributed hash chain on one or more nodes, and/or by the centralized management entity, as a secondary structure. A hash tree or Merkle tree generally is a tree in which every leaf (e.g., at the bottom of the tree) is labelled with the hash of a data block and every non-leaf (e.g., higher up the tree) is labelled with the cryptographic hash of the labels of its children. Hash trees allow efficient and secure verification of the contents of large data structures. For example, each block of the hash chain may be hashed to form the bottom leaves of a tree structure. Each leaf pair may then be then combined and hashed to form the next tree layer. This may be repeated until a single root hash is created at the top. The root hash may then be stored in association with the chain. For example, each block may maintain a root hash for the chain calculated at the time the block is added. Limited blocks may comprise the root hash of the chain at the time the complete block on which the limited block is based was added to the chain. To validate a block, a node may send the block, including the root hash, along with the adjacent leaves that lead up to the root hash as a Merkle proof. This may involve sending just two leaves (hashes) per level in the tree. The recipient (e.g., a requesting node or application) can then confirm the block is correct by computing the block hash and re-computing the hash tree for the provided leaves. If the root hash matches the final hash, the block is proven to be validated, and a member of the chain based on the tree. In some embodiments, a node with a limited block may send the root hash and adjacent leaves to a requesting entity, and then send a request to a node with the complete block to forward the complete block to the requesting entity (e.g., if the requesting entity has permission to access the data in the complete block).

While some embodiments involve both limited blocks and distributed permissions, each of these may also be implemented independently. For example, even when all nodes of a distributed hash chain comprise all complete blocks of the chain, permissions for the blocks may still be maintained at each node so that they may be applied to entities other than nodes which request data from the hash chain. For example, distributed permission information may specify that the data of a particular block may only be accessed by a certain user account. If a request for the data in the particular block is received by a node from a user other than the particular user, the request may be denied.

Embodiments of the present disclosure constitute an improvement over existing techniques for maintaining data in distributed hash chains, as they allow for sensitive data to be isolated and protected while still preserving the integrity of the hash chain on all nodes through the use of limited blocks. Ensuring that sensitive data is not stored or accessed by entities without permission to store or access the sensitive data improves security and privacy in distributed hash chains, and makes storage of data on a distributed hash chain a viable option in a plurality of contexts in which security and privacy are important. Techniques described herein for distributed permission information allow for more efficient determination and enforcement of security requirements of data maintained in distributed hash chains. Techniques described herein for validation in distributed hash chains allow for the integrity of distributed hash chains to be verified without storing sensitive data on nodes that do not meet the security requirements of the sensitive data, and without requiring distribution of sensitive data to entities without permission to access the sensitive data.

Example Computing Environment

FIG. 1 depicts an example computing environment 100 in which embodiments of the present disclosure may be implemented.

Computing environment 100 comprises nodes 120 and 130, a management device 140, and a device 150, all of which are connected by a network 110 (e.g., the Internet). Nodes 120 and 130 may be physical or virtual computing devices, such as servers, desktop computers, laptop computers, portable electronic devices, smart devices, Internet of things (IoT) devices, or the like, and may comprise nodes of a distributed hash chain. While two nodes 120 and 130 are depicted, a plurality of additional nodes may also be connected to network 110, and may also store the distributed hash chain. Node 120 is located within region 160a, which may comprise a geographic region, and node 130 is located within region 160b, which may comprise a different geographic region. Nodes 120 and 130 comprise a plurality of blocks 122a-n and 132a-n that store data 124 and 134. Blocks 122a-n and 132a-n may each comprise a copy of a distributed hash chain. In some instances, data 124 and 134 may each comprise a plurality of items of data associated with one or more applications, such as application 152 executing on device 150. For example, data 124 and 134 may be user data associated with users of application 152.

Node managers 126 and 136 may perform operations related to management of blocks 122a-n and 132a-n on each of nodes 120 and 130, such as adding blocks, validating blocks, determining permission information, and communicating information to and from other entities. For example, node manager 126 may receive a particular item of data 124 from an entity (e.g., application 152) over network 110, and may generate a block 122n comprising the particular item of data 124 and thereafter append the block 122n to the end of the chain. The block 122n may comprise the particular item of data 124 as its payload, as well as header information comprising a hash of the particular item of data 124 (which, e.g., may serve as an identifier for block 122n) and a pointer to the previous block (e.g., block 122n-1). Node manager 126 may determine that the particular item of data 124 is sensitive, and that only particular entities may store and/or access the item of data 124. This determination may, for example, be based on metadata associated with the item of data 124 (e.g., added by application 152) and/or analysis of the contents of the item of data 124. Node manager 126 may determine, for example, that the particular item of data 124 must be stored by nodes located in a particular geographic region (e.g., region 160a), and that node 130 is not located in the particular geographic region (e.g., node 130 is located in region 160b). Node manager 126 may generate a limited block comprising the hash and pointer from block 122n, but not including the particular item of data 124, and distribute the limited block over network 110 to the nodes that are not in the geographic region, such as node 130. Node manager 136 of node 130 may receive the limited block and append it to the end of the chain as block 132n. Data 134 may comprise the some of the same items of data as data 124, except, as shown, the particular item of data 124 stored in block 122n is not stored in block 132n as part of data 134, as it is sensitive and not suited for storage on node 130.

Furthermore, permission information may be distributed and maintained by node managers 126 and 136 in association with blocks 122a-n and 132a-n. For example, node manager 126 may generate and distribute permission information for block 122n based on the determination of which entities may store and/or access the item of data 124.

Node managers 126 and 136 may handle requests for data 124 and 134. For example, node manager 136 may receive a request for the sensitive item of data in block 122n from application 152. Node manager 136 may determine, based on the distributed permission information, whether application 152 has permission to access the sensitive item of data. If application 152 does not have permission to access the sensitive item of data (e.g., if application 152 is not located within a geographic region, such as region 160a, in which the sensitive item of data must be maintained), node manager 136 may refuse the request. If application 152 does have permission to access the sensitive item of data, node manager 136 may determine that node 130 only has a limited block 132n, and does not have the complete block comprising the sensitive item of data. As such, node manager 136 may send a request to node manager 126 to forward the complete block to application 152. Node manager 126 may, in response to the request, send block 122n, including the sensitive item of data 124 to application 152.

Node managers 126 and 136 may also handle validation of blocks 122a-n and 132a-n. For example, application 152 may request an item of data 134 from node 130 (e.g., an item of data 134 stored in block 132n+1, which is not shown in FIG. 1). Node manager 136 may traverse the chain to validate each of blocks 132a-n in order to validate the entire chain leading up to block 132n+1. However, because node 130 only has a limited block for block 132n, node manager 136 may not be able to perform a full validation of block 132n. In some embodiments, node manage 136 may perform a lightweight validation by assuming the hash stored in block 132n is correct. In other embodiments, node manager 136 may send a request to node manager 126 on node 120 for validation of the block. Node manager 126 may validate block 122n (e.g., by calculating a hash of the block's data and comparing it to the hash stored in the block's header), and may provide a validation confirmation for the block to node manager 136. In other embodiments, node manager 136 may include the hash from the header of the limited block 132n in the request for validation sent to node manager 136, and node manager 126 may calculate a hash of the item of data in block 122n and compare the calculated hash to the hash received in the request for validation. If the hashes match, the block is validated, and node manager 126 may provide a validation confirmation for the block to node manager 136. In other embodiments, node manager 126 may calculate a hash of block 122n based on the item of data stored in block 122n, and may provide the calculated hash to node manager 136, which may perform validation by comparing the calculated hash to the hash stored in the limited block 132n to confirm that they match. In other embodiments, node 120 may act as a validator for the entire chain for all nodes, as it stores all complete blocks in the chain. For example, node manager 126 may respond to validation requests with a validation confirmation for the entire chain. In some embodiments, node managers 126 and 136 may maintain Merkle trees in association with blocks 122a-n and 132a-n, and may provide Merkle proofs along with blocks to requesting entities so that the requesting entities may validate the blocks.

Management device 140 may comprise a physical or virtual computing device, such as a server, desktop computer, laptop computer, portable electronic device, or the like, which performs functions related to management of a distributed hash chain. As depicted in FIG. 1, management device 140 comprises a block manager 142, which may perform operations related to management of blocks 122a-n and 132a-n on nodes 120 and 130 in the distributed hash chain. In some embodiments, block manager 142 may maintain information about which nodes store complete or limited versions of blocks, and may also store permission information associated with blocks. Block manager 142 may receive and route requests for data from requesting entities to appropriate nodes to handle the requests. Block manager 142 may route requests to nodes based, for example, on permission data, storage location information of blocks, geographic location, predefined rules, and the like. For example, all requests originating from a particular geographic location may be routed by block manager 142 to a node in that particular geographic location. Location information may, for example, be based on satellite positioning system data captured by a device from which a request is sent, and may be included in the request. In another embodiment, location information may be determined based on an IP address of the device from which the request is sent.

Device 150 may comprise a physical or virtual computing device, such as a desktop or laptop computer, mobile device, or the like, which runs an application 152. In some embodiments, the application 152 may be representative of a component of a client server application (or other distributed application), which can communicate with management device 140 and nodes 120 and 130 over network 110. In certain embodiments, application 152 may be a conventional software application (e.g., a tax preparation application or an accounting application) installed on device 150, and may communicate with the distributed hash chain over network 110 in order to store, manage, and request items of data 124 and 134 stored in blocks 122a-n and 132a-n.

In one embodiment, application 152 communicates with management device 140 at run-time (e.g., over network 110 using a protocol such as TCP/IP). For example, application 152 may store its associated application data as items of data 124 and 134. Application data may, for example, comprise data associated with the execution of application 152, such as user data. For example, block 122a may comprise a user's name, block 122b may comprise the user's address, block 122c may comprise the user's date of birth, block 122d may comprise an update to the user's address, and so on. Application 152 may then access application data (e.g., the user's name, address, date of birth, etc.) as needed during execution (e.g., when application 152 is first launched, it may request the state of all of its application data from the distributed hash chain). In some embodiments, requests directed to the distributed hash chain from application 152 are handled by block manager 142 on management device 140, which may route requests to appropriate nodes.

Figure 2:
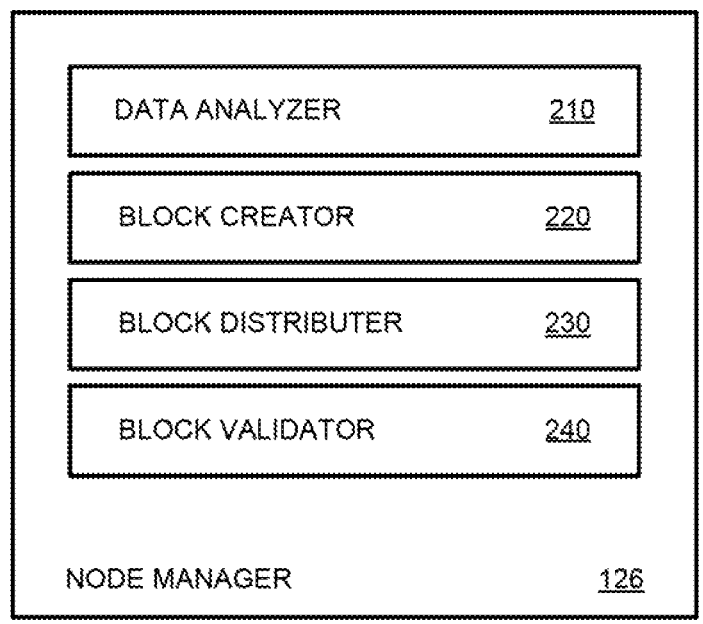
FIG. 2 depicts example components of a node manager according to certain embodiments.

FIG. 2 depicts example components of a node manager 126, according to embodiments of the present disclosure. As depicted, node manager 126 comprises a data analyzer 210, a block creator 220, a block distributer 230, and a block validator 240. Each of these components may perform functions related to managing data in a distributed hash chain. While certain components are described as performing certain operations, other arrangements are possible.

Data analyzer 210 may analyze data stored in blocks by node 120 from FIG. 1 in order to determine whether the data is sensitive, and/or whether it is suited for storage on other nodes in the distributed system. For example, data analyzer 210 may analyze metadata associated with an item of data at the time the item of data is stored in a block on node 120 to determine security requirements for storing and/or accessing the data, such as certain nodes, users, or geographic regions that may store and/or access the data. Data analyzer 210 may generate permission information for the block based on the analysis (e.g., of the metadata). If data analyzer 210 determines that one or more nodes in the distributed system does not have permission to store the item of data (e.g., based on distributed information about each node and the security requirements of the item of data), block creator 220 may create a limited block based on the block. For example, block creator 220 may generate a limited block comprising the hash and pointer to the previous block from the block, but not containing the item of data. Block distributer 230 may then distribute the limited block to the one or more nodes that do not have permission to store the item of data, and each of those nodes may append the limited block to the end of a local version of the distributed hash chain. In some embodiments, block distributer 230 also distributes the permission information along with the limited block. In certain embodiments, block distributer 230 distributes the permission information to all nodes in the distributed system. Block distributer 230 may also distribute the complete block comprising the item of data to any node in the distributed system that does have permission to store the item of data, such as nodes which are in an appropriate geographic region for the item of data.

Block validator 240 may perform operations related to validation of blocks of the distributed hash chain. For example, block validator may validate a block by calculating a hash of the data stored as the block's payload and comparing the calculated hash to a hash stored in the block's header (e.g., the identifier of the block). If the two hashes match, then the block is validated. In certain embodiments, if a block is a limited block, block validator may send a request to a node with a complete version of the block to validate the block. Block validator may also maintain and distribute Merkle trees and/or Merkle proofs in association with the hash chain for the purposes of validation. In some embodiments, block validator 240 may validate and/or enable validation (e.g., through requesting validation from another node and/or sending hashes to a requesting entity for validation) of the entire hash chain or a portion of the hash chain every time data is requested from the hash chain. In certain embodiments, block validator 240 returns a validation confirmation to requesting entities upon validating one or more blocks, the validation confirmation comprising a message indicating that the one or more blocks have been validated.

Example Computer-Implemented Method

Figure 3:
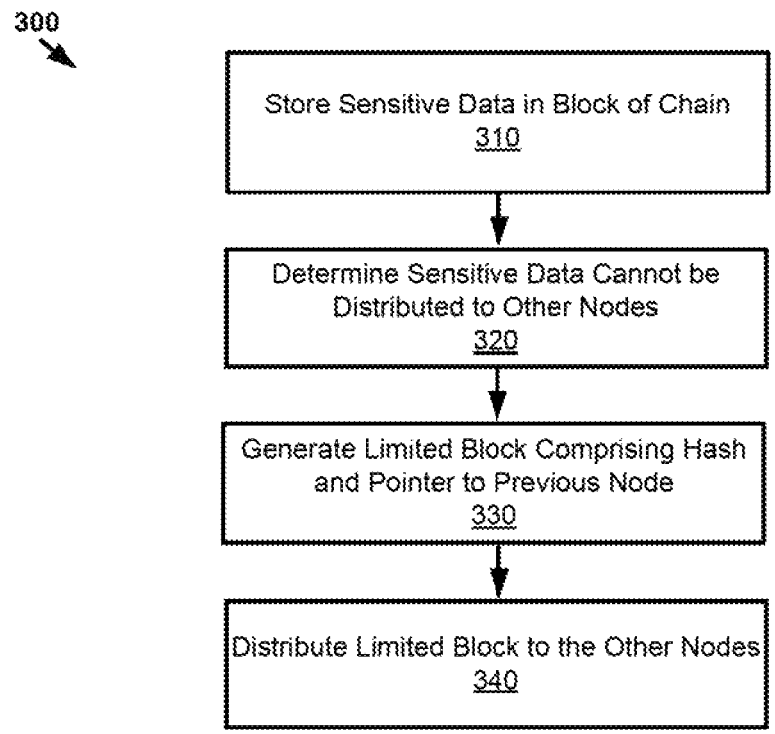
FIG. 3 depicts example operations for isolating data in distributed hash chains, according to certain embodiments.

FIG. 3 depicts example operations 300 for isolating data in distributed hash chains, according to certain embodiments. Operations 300 may, for example, be performed by node manager 126 of FIGS. 1 and 2.

Operations 300 begin at step 310, where sensitive data is stored in a block of a hash chain. The sensitive data may be received from an application that is storing its application data (e.g., user data) on the distributed hash chain, and node manager 126 may store the sensitive data as the payload of a block. Node manager 126 may calculate a hash of the sensitive data and store the hash along with a pointer to the previous block on the chain as header information of the block. The hash may serve as an identifier of the block. Node manager 126 may append the block to the tail of the hash chain on node 120 of FIG. 1.

At step 320, it is determined that the sensitive data may be distributed to other nodes in the distributed system. The security requirements for storing and/or accessing the sensitive data may be determined based on metadata associated with the sensitive data that indicates the security requirements for storing and/or accessing the sensitive data. Alternatively, the security requirements of the sensitive data may be determined based on analysis of the source and contents of the sensitive data, such as by determining a user or geographic region from which the sensitive data was received, and/or by parsing text to identify keywords and then determining keywords that are associated with certain security requirements in a predefined dictionary (e.g., a predetermined data structure which includes associations between keywords and security requirements). Node manager 126 may generate permission information based on the security requirements for the data. Node manager 126 may then determine whether each node in the distributed system has permission to store the sensitive data based on the permission information and distributed information from each node about the node's identity and properties. For example, the permission information may indicate that the sensitive data must be stored in a particular geographic region. Node manager 126 may determine based on information distributed by the other nodes or through communication with a central authority such as block manager 142, which may maintain information about all nodes, that the other nodes in the distributed system are not in the particular geographic region, and so the sensitive data cannot be distributed to these nodes.

At step 330, node manager 126 generates a limited block comprising the hash of the block and the pointer to the previous node, but does not include the sensitive data as payload.

At step 340, node manager 126 distributes the limited block to the other nodes that do not have permission to store the sensitive data. Each of the other nodes may receive the limited block and append it to the end of a local version of the distributed hash chain.

Figure 4:
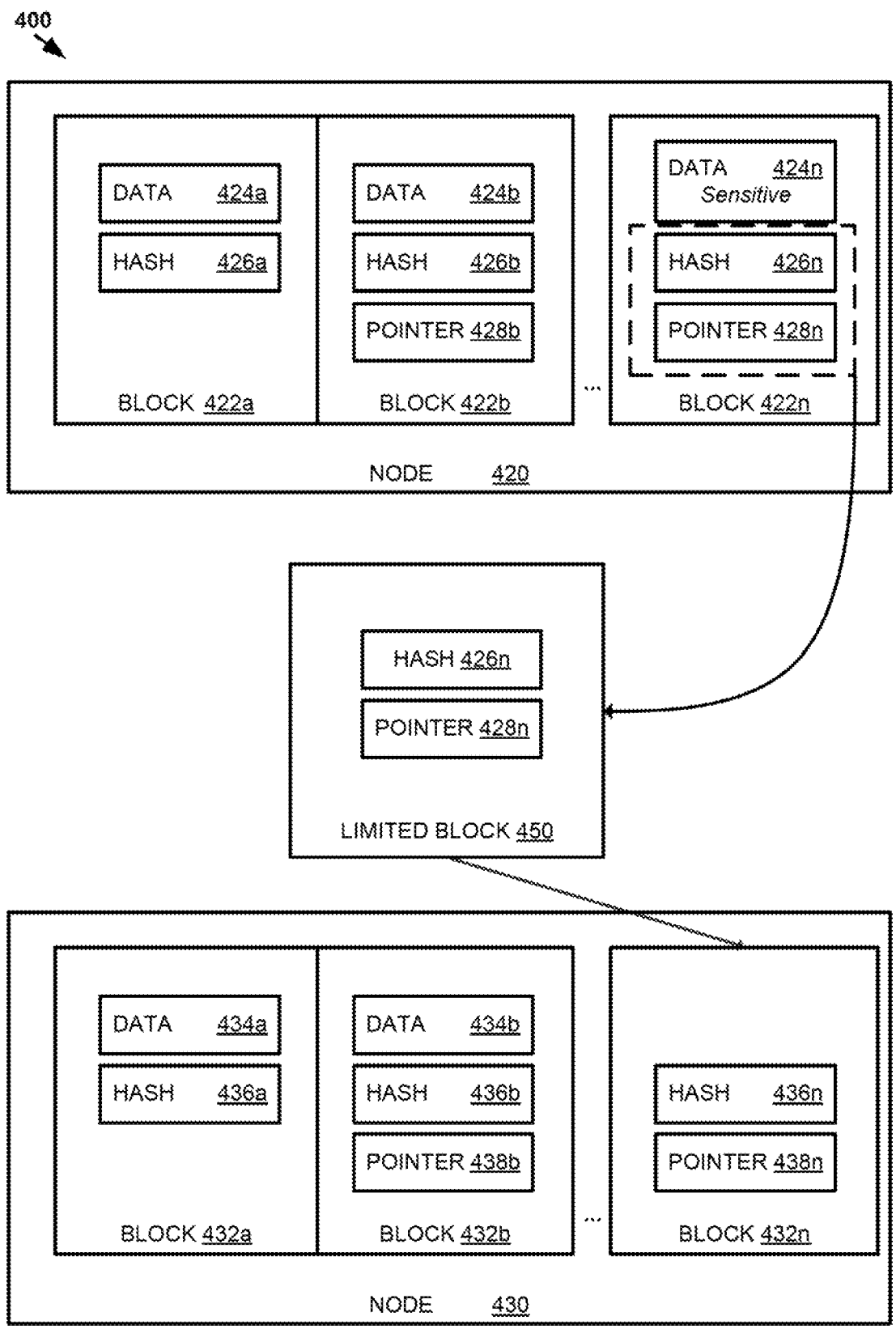
FIG. 4 depicts an example of creating and distributing a limited block, according to certain embodiments.

FIG. 4 depicts an example 400 of creating and distributing a limited block. As depicted, node 420 comprises blocks 422a-n. Block 422a comprises data 424a as well as hash 426a, which may comprise an identifier of the block. Each subsequent block 422b-n comprises data 424b-n, hash 426b-n and pointer 428b-n (e.g., a pointer to the previous block). Node 420 may generate limited block 450 (e.g., via a block creator, such as 220 in FIG. 2) based on block 422n, comprising hash 426n and pointer 428n, but not including data 424n, which is sensitive. For example, node 420 may determine that data 424n may not be stored on node 430, and may generate limited block 450 for distribution to node 430.

As depicted, limited block 450 is distributed to node 430, which stores limited block 450 as block 432n at the tail of its local version of the distributed hash chain, blocks 432a-n.

Figure 5:
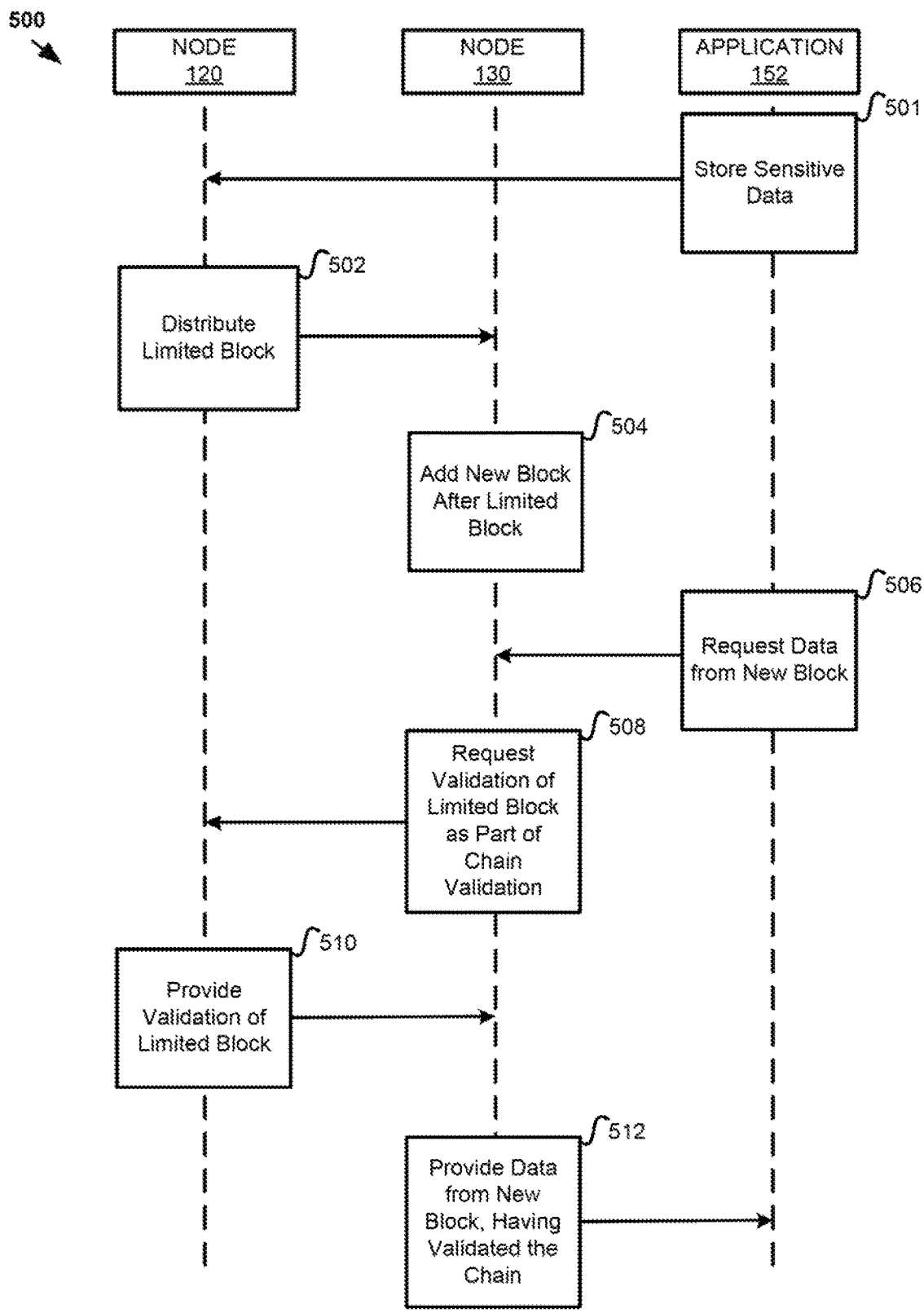
FIG. 5 depicts an example exchange of messages related to isolating data in distributed hash chains, according to certain embodiments.

FIG. 5 depicts an example message flow 500 related to isolating data in distributed hash chains, according to certain embodiments. Message flow 500 may be exchanged between node 120, node 130, and application 152, which are described above with respect to FIG. 1.

At 501, application 152 sends sensitive data to the hash chain. For example, application 152 may send sensitive user data to be stored on node 120. Node 120 may determine that the data is sensitive, and that node 130 does not have permission to store the data. As such, node 120 may store a complete block locally and generate a limited block for distribution to node 130.

At 502, node 120 distributes a limited block to node 130, which stores the limited block at the end of its local version of a distributed hash chain.

At 504, node 130 adds a new block to the tail of its local version of the distributed hash chain following the limited block. For example, an application may write additional data to the distributed hash chain, which node 130 may store in the new block.

At 506, application 152 requests the data from the new block on node 130. Node 130 may validate the chain before providing the data in response to the request. When node 130 determines that it has a limited block, at 508, node 130 requests validation of the limited block from node 120, which stores a complete version of the limited block. In some embodiments, node 130 determines that node 120 stores a complete version of the limited block based on metadata associated with the limited block, using information distributed by node 120, or through communication with a central authority such as block manager 142 in FIG. 1. Node 120 may validate the complete version of the limited block and then provide a validation confirmation for the limited block to node 130. Node 130 may then complete validation of the chain by validating the rest of the complete blocks stored on node 130.

At 512, node 130 provides the data from the new block to application 152. In some embodiments, node 130 may include a validation confirmation with the data in order to indicate that the data was retrieved from a chain that has been validated.

Message flow 500 only depicts one embodiment of validation. Other validation processes may be used, such as performing lightweight validation where certain hashes (e.g., of limited blocks) are assumed to be correct, or by performing validation of the entire chain by a single node with all complete blocks, or by the entity requesting the data based on hash information received from nodes performing validation.

Figure 6:
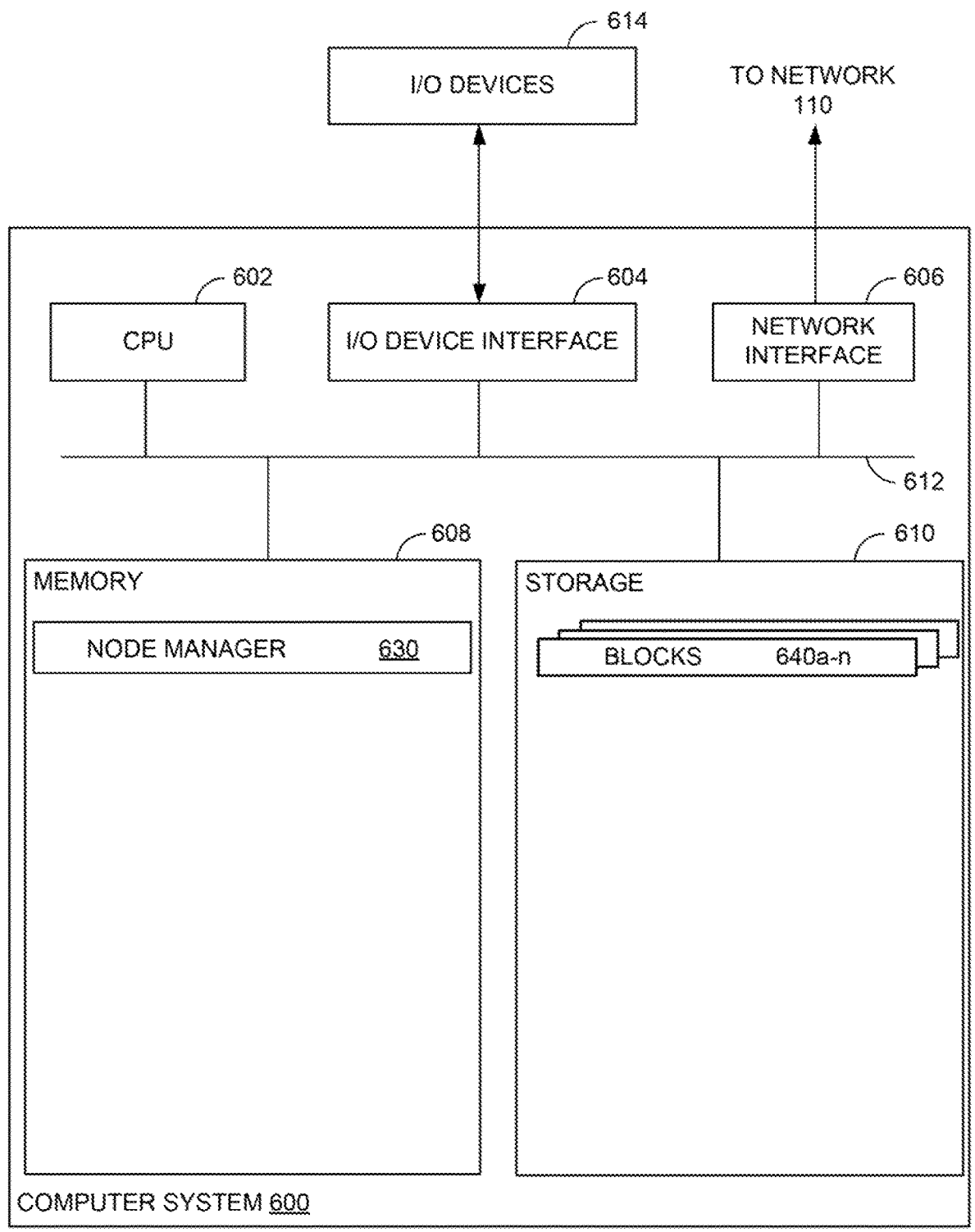
FIG. 6 depicts an example computing system with which embodiments of the present disclosure may be implemented.

FIG. 6 illustrates an example computer system 600 used for isolating data in distributed hash chains, according to embodiments of the present disclosure. For example, computer system 600 may be representative of a node 120 or 130 in FIG. 1. As shown, the system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single. CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a node manager 630, which may comprise a component (e.g., local or distributed) that manages data maintained on a distributed hash chain (e.g., functionality described above with respect to FIGS. 1-4). Node manager 630 may employ techniques for isolating data in distributed hash chains as described herein. For example, node manager 630 may manage data stored in one or more blocks 640a-n of storage 610, which may comprise a local version of a distributed hash chain. The node manager 630 in memory 608 may communicate with other devices (e.g., other nodes, management device 140, and device 150) over network 110 through network interface 606 (e.g., in order to store, access, analyze, distribute, and otherwise process data associated with blocks 640a-n n storage 610 as described herein).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for managing data in a plurality of nodes of a distributed system, comprising:
   storing, by a node of the plurality of nodes, sensitive data in a block of a hash chain;
   determining, by the node, that the sensitive data should not be distributed to other nodes of the plurality of nodes;
   distributing, by the node, a limited version of the block to the other nodes, wherein the limited version of the block comprises a hash and a pointer to a previous block of the hash chain, and wherein the limited version of the block does not contain the sensitive data;
   receiving, by the node, a request for validation of the block from a remote node of the plurality of nodes;
   validating, by the node, the block; and sending, by the node, a validation confirmation for the block to the remote node.

2. The computer-implemented method of claim 1, further comprising: distributing, by the node, permission information for the block to the plurality of nodes, wherein the permission information defines permissions to access the sensitive data.

3. The computer-implemented method of claim 2, the permission information defines an administrative domain.

4. The computer-implemented method of claim 2, further comprising:
receiving, by the node, a request for the block from a remote node of the plurality of nodes;
determining, by the node and based on the permission information, whether the remote node has permission to access the sensitive data; and
upon determining, by the node, that the remote node has permission to access the sensitive data, sending, by the node, the block to the remote node.

5. The computer-implemented method of claim 1, wherein validating the block comprises:
calculating a new hash based on the sensitive data; and
comparing the new hash to a hash included in the request for validation.

6. The computer-implemented method of claim 1, further comprising:
receiving, by the node, a request for validation of the hash chain from a remote node of the plurality of nodes;
validating, by the node, the hash chain; and
sending, by the node, a validation confirmation for the hash chain to the remote node.

7. A system comprising:
a processor; and
a non-transitory computer-readable medium storing instructions which, when executed by the processor, cause the processor to perform an operation for managing data in a plurality of nodes of a distributed system, the operation comprising:
storing, by a node of the plurality of nodes, sensitive data in a block of a hash chain;
determining, by the node, that the sensitive data should not be distributed to other nodes of the plurality of nodes;
distributing, by the node, a limited version of the block to the other nodes, wherein the limited version of the block comprises a hash and a pointer to a previous block of the hash chain, and wherein the limited version of the block does not contain the sensitive data;
receiving, by the node, a request for validation of the hash chain from a remote node of the plurality of nodes;
validating, by the node, the hash chain; and
sending, by the node, a validation confirmation for the hash chain to the remote node.

8. The system of claim 7, wherein the operation further comprises: distributing, by the node, permission information for the block to the plurality of nodes, wherein the permission information defines permissions to access the sensitive data.

9. The system of claim 8, wherein the permission information defines an administrative domain.

10. The system of claim 8, wherein the operation further comprises:
receiving, by the node, a request for the block from a remote node of the plurality of nodes;
determining, by the node and based on the permission information, whether the remote node has permission to access the sensitive data; and
upon determining, by the node, that the remote node has permission to access the sensitive data, sending, by the node, the block to the remote node.

11. The system of claim 7, wherein the operation further comprises:
receiving, by the node, a request for validation of the block from a remote node of the plurality of nodes;
validating, by the node, the block; and
sending, by the node, a validation confirmation for the block to the remote node.

12. The system of claim 11, wherein validating the block comprises:
calculating a new hash based on the sensitive data; and
comparing the new hash to a hash included in the request for validation.

13. A non-transitory computer-readable medium storing instructions that, when executed by a processor of a computing system, cause the computing system to perform an operation for managing data in a plurality of nodes of a distributed system, the operation comprising:
storing, by a node of the plurality of nodes, sensitive data in a block of a hash chain;
determining, by the node, that the sensitive data should not be distributed to other nodes of the plurality of nodes;
distributing, by the node, a limited version of the block to the other nodes, wherein the limited version of the block comprises a hash and a pointer to a previous block of the hash chain, and wherein the limited version of the block does not contain the sensitive data;
receiving, by the node, a request for validation of the hash chain from a remote node of the plurality of nodes;
validating, by the node, the hash chain; and
sending, by the node, a validation confirmation for the hash chain to the remote node.

14. The non-transitory computer-readable medium of claim 13, wherein the operation further comprises: distributing, by the node, permission information for the block to the plurality of nodes, wherein the permission information defines permissions to access the sensitive data.

15. The non-transitory computer-readable medium of claim 14, wherein the permission information defines an administrative domain.

16. The non-transitory computer-readable medium of claim 14, wherein the operation further comprises:
receiving, by the node, a request for the block from a remote node of the plurality of nodes;
determining, by the node and based on the permission information, whether the remote node has permission to access the sensitive data; and
upon determining, by the node, that the remote node has permission to access the sensitive data, sending, by the node, the block to the remote node.

17. The non-transitory computer-readable medium of claim 13, wherein the operation further comprises:
receiving, by the node, a request for validation of the block from a remote node of the plurality of nodes;
validating, by the node, the block; and
sending, by the node, a validation confirmation for the block to the remote node.

18. The non-transitory computer-readable medium of claim 17, wherein validating the block comprises:
calculating a new hash based on the sensitive data; and comparing the new hash to a hash included in the request for validation.

\* \* \* \* \*